(12) United States Patent
Yamada et al.

(10) Patent No.: US 11,953,708 B2
(45) Date of Patent: Apr. 9, 2024

(54) CAMERA DEVICE

(71) Applicant: PANASONIC I-PRO SENSING SOLUTIONS CO., LTD., Fukuoka (JP)

(72) Inventors: Hideaki Yamada, Fukuoka (JP); Jyouji Wada, Fukuoka (JP); Toshiyuki Sano, Fukuoka (JP); Akito Omata, Fukuoka (JP); Yuma Kobayashi, Fukuoka (JP); Naoaki Tomisaka, Fukuoka (JP)

(73) Assignee: I-PRO CO., LTD., Tokyo (JP)

( * ) Notice: Subject to any disclaimer, the term of this patent is extended or adjusted under 35 U.S.C. 154(b) by 382 days.

(21) Appl. No.: 17/152,367

(22) Filed: Jan. 19, 2021

(65) Prior Publication Data

US 2021/0223446 A1 Jul. 22, 2021

(30) Foreign Application Priority Data

Jan. 20, 2020 (JP) .................. 2020-007061

(51) Int. Cl.
*G02B 5/20* (2006.01)
*G02B 5/30* (2006.01)
*B60R 11/04* (2006.01)

(52) U.S. Cl.
CPC ........... *G02B 5/208* (2013.01); *G02B 5/3025* (2013.01); *G02B 5/3083* (2013.01); *B60R 11/04* (2013.01)

(58) Field of Classification Search
CPC ........ G02B 5/208; G02B 5/3083; G02B 5/20; G02B 5/204; G02B 5/281; G02B 5/30; G02B 5/3025–3058; B60R 11/04
See application file for complete search history.

(56) References Cited

U.S. PATENT DOCUMENTS

| | | |
|---|---|---|
| 9,953,210 B1 | 4/2018 | Rozploch et al. |
| 2009/0050807 A1 | 2/2009 | Ota et al. |

(Continued)

FOREIGN PATENT DOCUMENTS

| | | |
|---|---|---|
| JP | 2007-174016 | 7/2007 |
| JP | 2009-055107 | 3/2009 |

(Continued)

OTHER PUBLICATIONS

Office Action from Japan Patent Office (JPO) in Japanese Patent Appl. No. 2020-007061, dated Oct. 10, 2023, together with an English language translation.

*Primary Examiner* — Stephone B Allen
*Assistant Examiner* — Adam W Booher
(74) *Attorney, Agent, or Firm* — Greenblum & Bernstein, P.L.C.

(57) ABSTRACT

A camera device includes a first filter configured to restrict a transverse wave component of incident light having light of a plurality of different wavelength bands generated based on birefringence in a car film from a vehicle to which the car film is adhered, a lens on which a vertical wave component of the incident light transmitted through the first filter is incident, a second filter configured to restrict a vertical wave component of the incident light in a visible region among the vertical wave component of the incident light imaged by the lens, and an imaging element configured to image the vehicle as a subject based on a vertical wave component of the incident light in a near-infrared region transmitted through the second filter.

10 Claims, 11 Drawing Sheets

(56) References Cited

U.S. PATENT DOCUMENTS

| | | | |
|---|---|---|---|
| 2012/0262577 A1* | 10/2012 | Wang | G06V 40/103 |
| | | | 348/148 |
| 2018/0095206 A1 | 4/2018 | Hirata | |
| 2018/0348596 A1* | 12/2018 | Reed | H04N 23/55 |
| 2018/0349679 A1 | 12/2018 | Rozploch et al. | |
| 2019/0052792 A1* | 2/2019 | Baba | G06V 10/147 |

FOREIGN PATENT DOCUMENTS

| | | |
|---|---|---|
| JP | 2009-130709 | 6/2009 |
| JP | 2017-067865 | 4/2017 |
| JP | 2019-023860 | 2/2019 |
| WO | 2016/162983 | 10/2016 |

* cited by examiner

| | DAYTIME MODE | NIGHTTIME MODE |
|---|---|---|
| FRONT FILTER SWITCHING MODULE | POLARIZING FILTER | BAND-PASS FILTER |
| IN-LENS FILTER SWITCHING MODULE | VISIBLE LIGHT CUT FILTER | PLAIN GLASS |
| SHORT WAVELENGTH ILLUMINATION (LED) AT NIGHT | TURN OFF | TURN OFF |

TBL1

CAMERA DEVICE

CROSS REFERENCE TO RELATED APPLICATIONS

This application is based on Japanese Patent Application (No. 2020-007061) filed on Jan. 20, 2020, the contents of which are incorporated herein by reference.

BACKGROUND OF THE INVENTION

1. Field of the Invention

The present disclosure relates to a camera device configured to adjust image quality of a captured image.

2. Description of the Related Art

JP-A-2007-174016 discloses a monitoring device that irradiates with near-infrared light toward an expected region in which a face of an occupant in driving is expected to be positioned, images an imaging region including the expected region, specifies a specific imaging range in which the face of the occupant is imaged in a captured image, and performs an image processing such that luminance of an image in the specific imaging range is constant. The monitoring device monitors the occupant by analyzing the image in the specific imaging range and recognizing a state of the face of the occupant.

The monitoring device of JP-A-2007-174016 is installed in a vehicle to monitor whether a driver is looking away or looking aside in driving, and the face of the occupant such as the driver is inevitably imaged in the expected region. That is, it is assumed that the face of the occupant appears in the captured image, and a technical measure when the face of the occupant does not appear in the captured image is not taken into consideration.

Here, in a case where a configuration of JP-A-2007-174016 is applied to a monitoring camera installed to the outside of the vehicle (for example, a pole on a street), when a commercially available car film is adhered to a windshield of the vehicle, natural light such as sunlight in a daytime is birefringent and reflected by the car film, so that a rainbow appears on substantially an entire windshield portion of the captured image of the camera. In particular, in countries or regions where the sunlight is strong, the car film is often adhered to the windshield of the vehicle. In this case, since the face of the occupant such as the driver in the vehicle does not appear in the captured image, for example, image quality that enables image recognition of the face of the occupant cannot be obtained, and monitoring accuracy of the occupant in the vehicle cannot be improved.

SUMMARY OF THE INVENTION

The present disclosure has been made in view of the related circumstances described above, and an object of the present disclosure is to provide a camera device that effectively prevents an occurrence of a rainbow appearing on a windshield portion of a vehicle of a captured image in which a windshield of the vehicle is a main subject, and supports improvement in image quality of a face of an occupant.

The present disclosure provides a camera device including: a first filter configured to restrict a transverse wave component of incident light having light of a plurality of different wavelength bands generated based on birefringence in a car film from a vehicle to which the car film is adhered, a lens on which a vertical wave component of the incident light transmitted through the first filter is incident, a second filter configured to restrict a vertical wave component of the incident light in a visible region among the vertical wave component of the incident light imaged by the lens, and an imaging element configured to image the vehicle as a subject based on a vertical wave component of the incident light in a near-infrared region transmitted through the second filter.

The present disclosure provides a camera device including: a third filter configured to restrict incident light in a visible region of incident light having light among a plurality of different wavelength bands generated based on birefringence in a car film from a vehicle to which the car film is adhered, a lens on which the incident light in a near-infrared region transmitted through the third filter is incident, a fourth filter configured to restrict a transverse wave component of the incident light in the near-infrared region among the incident light in the near-infrared region imaged by the lens, and an imaging element configured to image the vehicle as a subject based on a vertical wave component of the incident light in the near-infrared region transmitted through the fourth filter.

According to the present disclosure, it is possible to effectively prevent an occurrence of a rainbow appearing on a windshield portion of a vehicle of a captured image in which a windshield of the vehicle is a main subject, and it is possible to support improvement in image quality of a face of an occupant.

DETAILED DESCRIPTION OF THE EXEMPLARY EMBODIMENTS

Hereinafter, embodiments of a camera device and an image quality adjustment method according to the present disclosure will be described in detail with reference to the accompanying drawings. However, an unnecessarily detailed description may be omitted. For example, a detailed description of a well-known matter or a repeated description of substantially the same configuration may be omitted. This is to avoid unnecessary redundancy in the following description and to facilitate understanding of those skilled in the art. The accompanying drawings and the following description are provided for a thorough understanding of the present disclosure for those skilled in the art, and are not intended to limit the subject matter in the claims.

In the following description, as the camera device according to the present disclosure, a vehicle imaging camera that images a vehicle as a subject is shown, and both a general road and an expressway may be collectively referred to as a "road".

Figure 1:
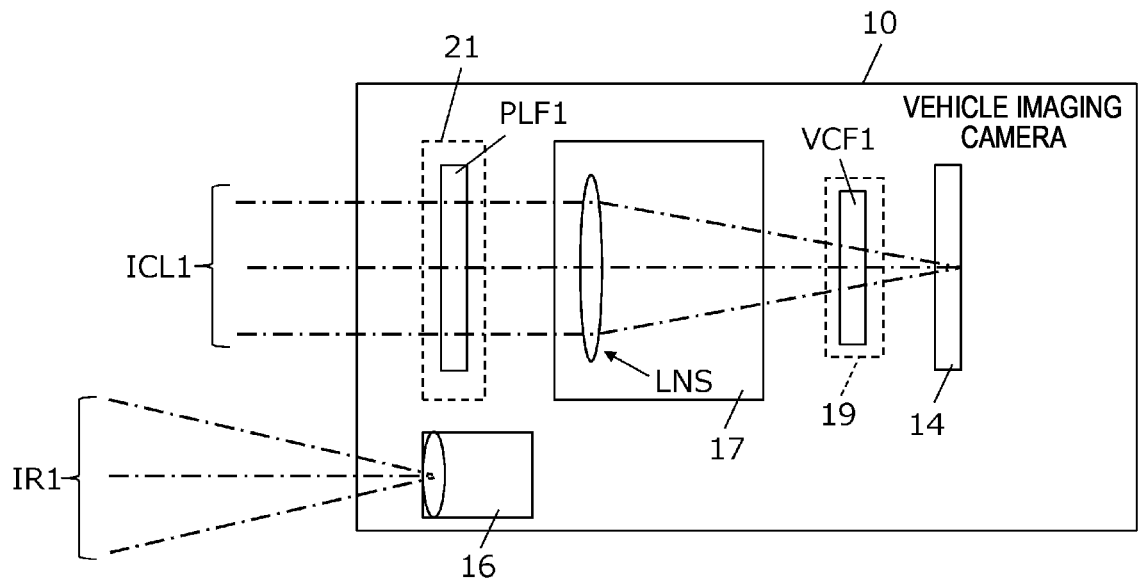
FIG. 1 is a diagram showing an arrangement example of a lens and optical filters in a vehicle imaging camera according to a first embodiment.

FIG. 1 is a diagram showing an arrangement example of a lens LNS and optical filters in a vehicle imaging camera 10 according to a first embodiment. The vehicle imaging camera 10 is fixedly installed, for example, by attaching the vehicle imaging camera 10 to a pole (not shown) installed on a side of the general road or hanging the vehicle imaging camera 10 from a gantry (not shown) installed on the expressway. The vehicle imaging camera 10 images vehicles VCL0 and VCL1 entering an imaging area (for example, a road) within a fixed angle of view of a predetermined width (see FIG. 3 or 4). The vehicle imaging camera 10 transmits an image obtained by imaging (hereinafter, referred to as a "captured image") to a receiver (not shown) via a network (not shown). The network is a wireless network conforming to any one of a wireless local area network (LAN) such as Wi-Fi (registered trademark), Bluetooth (registered trademark), and wireless gigabit (WiGig), but is not limited thereto. The network may be a wired network such as a universal serial bus (USB) cable or a wired LAN. In the following description, the captured image includes not only captured image data but also camera identification (ID) of the vehicle imaging camera that images the captured image and information on imaging date and time.

The vehicle imaging camera 10 performs imaging while switching between a first imaging condition having an image parameter (described later) suitable for imaging of faces of occupants of the vehicles VCL0 and VCL1 and a second imaging condition having an image parameter (described later) suitable for imaging of license plates of the vehicles VCL0 and VCL1 in a time division manner. The vehicle imaging camera 10 images the vehicle under the first imaging condition (for example, an exposure time longer than a predetermined reference value is set) suitable for imaging a face of an occupant (for example, a driver or a driver and a passenger) in the vehicle, and images the vehicle under the second imaging condition (for example, an exposure time shorter than the predetermined reference value is set) suitable for imaging a license plate of the vehicle.

For example, when a frame rate is 30 fps, the vehicle imaging camera 10 can generate a captured image (that is, an image in which the face of the occupant is clearly reflected) imaged under the first imaging condition in an odd-numbered frame (for example, a first frame, a third frame, . . . and a twenty-ninth frame). In addition, when the frame rate is 30 fps, the vehicle imaging camera 10 can generate a captured image (that is, an image in which the license plate clearly appears) imaged under the second imaging condition in an even-numbered frame (for example, a second frame, a fourth frame, . . . and a thirtieth frame). As described above, the vehicle imaging camera 10 can substantially simultaneously image and generate an image clearly appearing the face of the occupant in the vehicle and an image clearly appearing the license plate for the same subject (for example, the vehicle). As shown in FIG. 1, the vehicle imaging camera 10 includes a front filter switching module 21 which is configured to dispose a polarizing filter PLF1 on a front side of the lens LNS, a lens block 17 which accommodates the lens LNS therein, an in-lens filter switching module 19 which is configured to dispose a visible light cut filter VCF1 on a front side of an imaging element 14, the imaging element 14, and a short wavelength illumination 16. In the following description, a band-pass filter that cuts light having a wavelength band in a visible region may be disposed in the in-lens filter switching module 19 instead of the visible light cut filter VCF1. Details of individual components will be described later with reference to FIG. 5. In the arrangement example of FIG. 1, with reference to the lens LNS, the polarizing filter PLF1 is disposed on the front side of the lens LNS, and the visible light cut filter VCF1 is disposed on a rear side of the lens LNS. The polarizing filter PLF1 may be disposed on the rear side of the lens LNS, and the visible light cut filter VCF1 may be disposed on the front side of the lens LNS (see FIG. 12).

Light (in other words, incident light ICL1) reflected by the subject such as the vehicle is incident on the polarizing filter PLF1 (an example of a first filter or a fourth filter) of the vehicle imaging camera 10. In the polarizing filter PLF1 as an example of the optical filter, incidence of a transverse wave component (so-called S-wave component) of the incident light ICL1 is restricted, and a vertical wave component (so-called P-wave component) of the incident light ICL1 is transmitted. The P-wave component of the incident light ICL1 transmitted through the polarizing filter PLF1 is focused by the lens LNS, passes through the visible light cut filter VCF1 (an example of a second filter or a third filter), and is imaged on an imaging surface of the imaging element 14 so as to be able to be received. In the visible light cut filter VCF1 as an example of the optical filter, a component having a wavelength band in the visible region of the light (that is, the P-wave component of the incident light ICL1) transmitted through the polarizing filter PLF1 is cut, and a remaining component having a wavelength band in a near-infrared region is transmitted. The light transmitted through the visible light cut filter VCF1 (P-wave component of the incident light ICL1 having a wavelength band in the near-infrared region) is received by the imaging element 14 and imaged. Accordingly, the vehicle imaging camera 10 can generate the captured image data of the subject. The vehicle imaging camera 10 can always perform imaging regardless of day and night while power is supplied, and can generate the captured image data of the subject by irradiating with near-infrared light IR1 from the short wavelength illumination 16 particularly at night.

Figure 2:
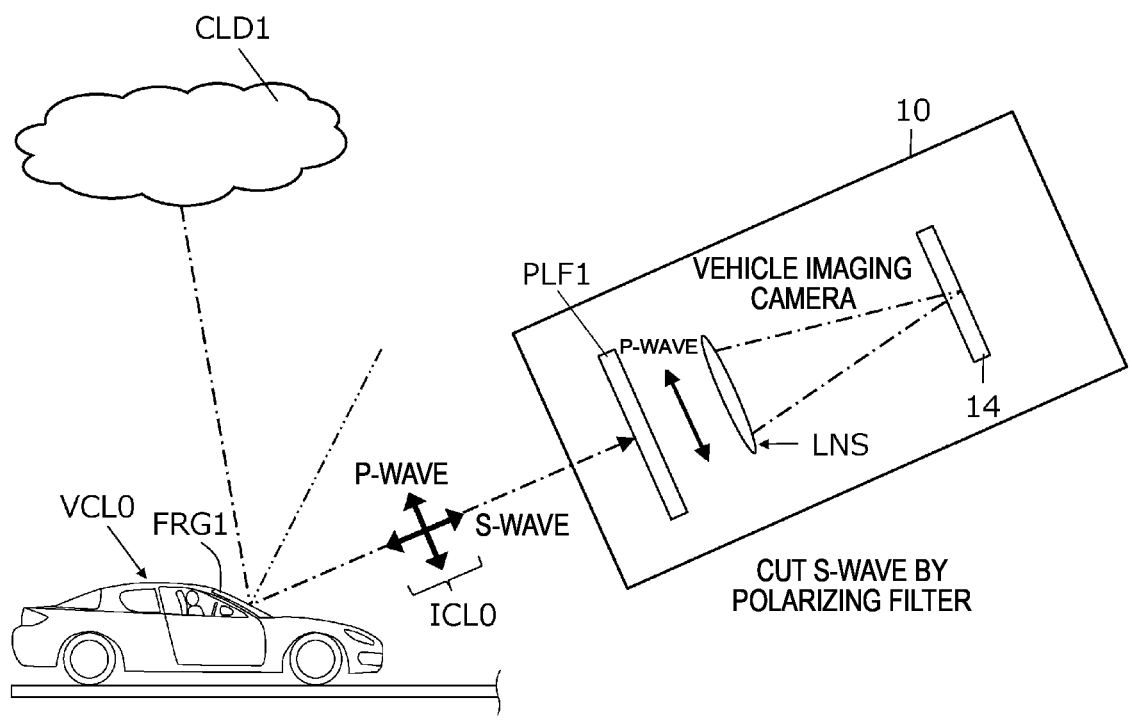
FIG. 2 is a diagram of light received by an imaging element when light reflected by a windshield of a vehicle to which a car film is not adhered is incident on the vehicle imaging camera.

FIG. 2 is a diagram of light received by the imaging element 14 when light reflected by a windshield FRG1 of the vehicle VCL0 to which a car film is not adhered is incident on the vehicle imaging camera 10. During a daytime, natural light such as sunlight falls from cloud CLD1. When such natural light is reflected by the windshield FRG1 to which the car film is not adhered, reflected light is incident on the vehicle imaging camera 10 as incident light ICL0. The incident light ICL0 includes a P-wave as the vertical wave component and an S-wave as the transverse wave component. The vehicle imaging camera 10 images the vehicle VCL0 as the subject based on the incident light ICL0. However, if the S-wave having a large reflectance is not cut, the cloud CLD1 appears in the captured image data, and image quality of the captured image data deteriorates. In other words, the face of the occupant such as the driver in the vehicle VCL0 cannot be imaged due to the cloud CLD1.

Therefore, in the vehicle imaging camera 10 according to the first embodiment, the polarizing filter PLF1 capable of cutting the S-wave having a large reflectance is disposed on the front side of the imaging element 14 (for example, on the front side of the lens LNS).

Accordingly, the vehicle imaging camera 10 can cut the S-wave component of the incident light ICL0 by the polarizing filter PLF1, and can generate the captured image data of the vehicle VCL0 based on the P-wave component of the incident light ICL0. Accordingly, the vehicle imaging camera 10 can generate the captured image data with high image quality in which appearance of the cloud CLD1 is reduced (for example, the face of the occupant such as the driver in the vehicle VCL0 appears in the captured image data).

Figure 3:
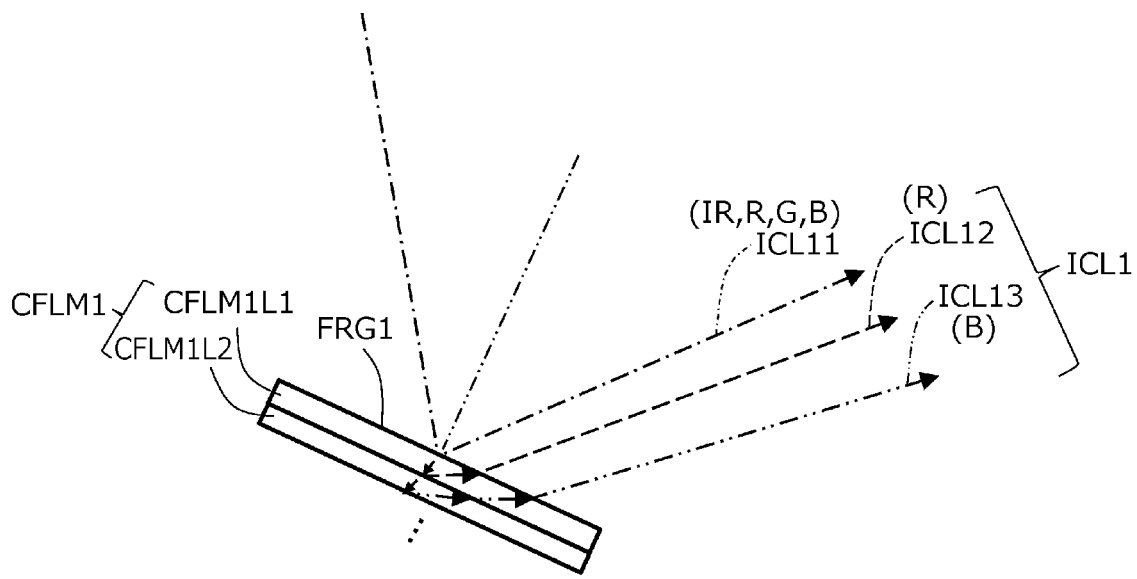
FIG. 3 is a diagram showing an example of a principle of birefringence of natural light such as sunlight on the car film.

FIG. 3 is a diagram showing an example of a principle of birefringence of the natural light such as the sunlight on a car film CFLM1. In a description of FIG. 3, the natural light incident on the car film CFLM1 is referred to as "incident light". The incident light includes, for example, a component having a wavelength band in the visible region (for example, 400 nm to 700 nm) and a component having a wavelength band in the near-infrared region (for example, 700 nm to 1000 nm). Hereinafter, light having a wavelength band in the visible region and a wavelength band in the near-infrared region is referred to as "light (IR, R, G, B)", light having a wavelength band in the near-infrared region is referred to as "light (IR)", light having a wavelength band in a red region is referred to as "light (R)", and light having a wavelength band in a blue region is referred to as "light (B)".

The incident light (IR, R, G, B) is reflected by a surface of the windshield FRG1, and front surface reflected light ICL11 (IR, R, G, B), which is a part of the reflected incident light (IR, R, G, B), is incident on the vehicle imaging camera 10. In addition, the incident light (IR, R, G, B) refracted by the windshield FRG1 is reflected (birefringence) by a back surface of a first layer CFLM1L1 of the car film CFLM1, and back surface reflected light ICL12 (R) generated by the birefringence becomes light having a wavelength band of a visible region of a single color (for example, red) and is incident on the vehicle imaging camera 10. Similarly, the incident light (IR, R, G, B) refracted by the first layer CFLM1L1 of the car film CFLM1 is reflected (birefringence) by a back surface of the second layer CFLM1L2 of the car film CFLM1, and back surface reflected light ICL13 (B) generated by the birefringence becomes light having a wavelength band of a visible region of a single color (for example, blue) and is incident on the vehicle imaging camera 10. Although an illustration is simplified in FIG. 3 to simplify a description, the car film CFLM1 is formed of multiple layers of film. Therefore, when light having a wavelength band in a visible region of a single color (for example, red, orange, yellow, green, blue, indigo blue, and purple) is incident on the vehicle imaging camera 10 due to back surface reflection of each layer, if only the S-wave component is cut by the polarizing filter PLF1, a rainbow RNBW1 appears in a windshield portion RNG1 of the captured image data with the vehicle VCL1 as the subject (see FIG. 8).

Figure 8:
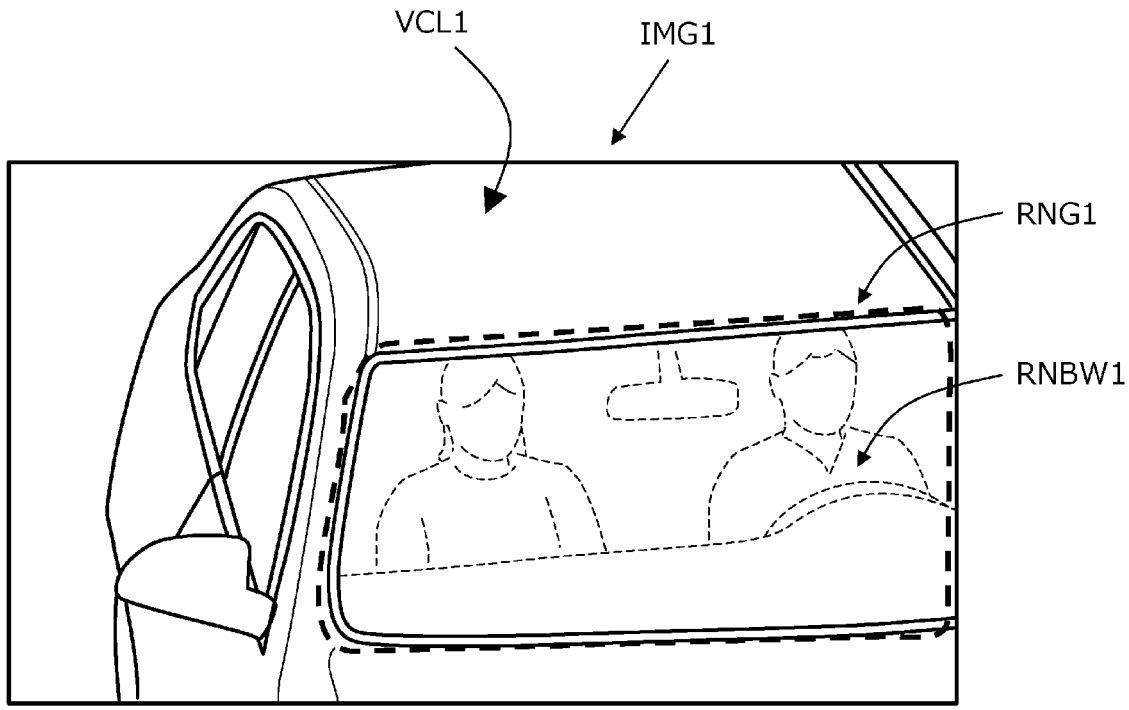
FIG. 8 is a diagram showing an example in which a rainbow appears on substantially an entire windshield portion of captured image data.

FIG. 8 is a diagram showing an example in which the rainbow RNBW1 appears on substantially the entire windshield portion RNG1 of captured image data IMG1. As shown in FIG. 8, when the rainbow RNBW1 appears on substantially the entire windshield portion RNG1, the face of the occupant such as the driver in the vehicle VCL1 cannot be imaged due to the rainbow RNBW1, and the face cannot be determined. For example, when a person (criminal) who causes an incident or an accident gets in the vehicle VCL1 and escapes, even if a police analyzes the captured image data IMG1 of the vehicle imaging camera 10, a face of the criminal cannot be imaged due to the rainbow RNBW1, and thus the criminal escapes, and investigation efficiency by the police is deteriorated.

Figure 4:
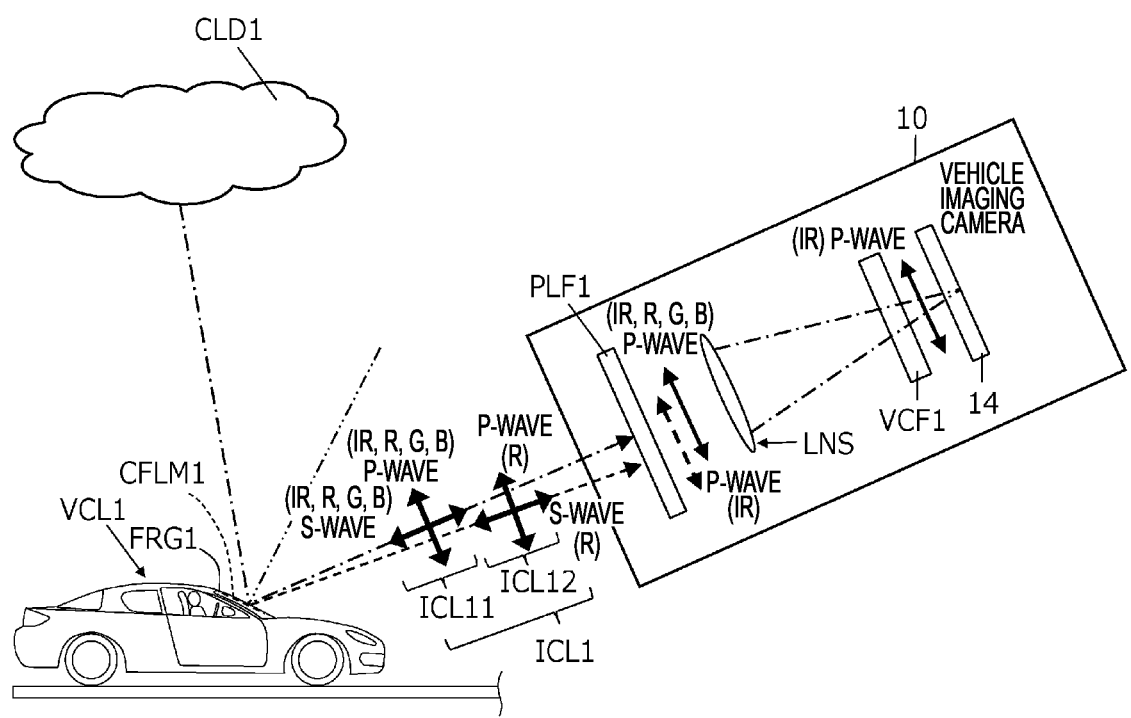
FIG. 4 is a diagram of light received by the imaging element when light reflected by the windshield of the vehicle to which the car film is adhered is incident on the vehicle imaging camera.

FIG. 4 is a diagram of light received by the imaging element 14 when light reflected by the windshield FRG1 of the vehicle VCL1 to which the car film CFLM1 is adhered is incident on the vehicle imaging camera 10. In order to avoid complication in FIG. 4, only the front surface reflected light ICL11 and the back surface reflected light ICL12 are shown as the incident light ICL1 to the vehicle imaging camera 10, and the back surface reflected light ICL13 (see FIG. 3) is omitted. During the daytime, the natural light such as the sunlight falls from the cloud CLD1. When such natural light is reflected by the windshield FRG1 to which the car film CFLM1 is adhered, the incident light ICL1 including the front surface reflected light ICL11 (IR, R, G, B), the back surface reflected light ICL12 (R), and the back surface reflected light ICL13 (B) is incident on the vehicle imaging camera 10 (see FIG. 3). Light included in the incident light ICL1 has a P-wave as the vertical wave component and an S-wave as the transverse wave component. The vehicle imaging camera 10 images the vehicle VCL0 as the subject based on the incident light ICL1. However, as described above, if only the S-wave component is cut by the polarizing filter PLF1, the rainbow RNBW1 appears in the captured image data, and the image quality of the captured image data deteriorates. In other words, the face of the occupant such as the driver in the vehicle VCL1 cannot be imaged due to the rainbow RNBW1.

Therefore, in the vehicle imaging camera 10 according to the first embodiment, the polarizing filter PLF1 capable of cutting the S-wave having a large reflectance is disposed on the front side of the imaging element 14 (for example, on the front side of the lens LNS), and further, the visible light cut filter VCF1 capable of cutting light in the visible region (for example, P-wave (R) of the back surface reflected light ICL12) is disposed on the front side of the imaging element 14.

Specifically, P-wave (IR, R, G, B) and S-wave (IR, R, G, B) of the front surface reflected light ICL11 included in the incident light ICL1 and the P-wave (R) and S-wave (R) of the back surface reflected light ICL12 included in the incident light ICL1 are incident on the vehicle imaging camera 10. In the polarizing filter PLF1, the incidence of the transverse wave component (so-called S-wave component)

of the incident light ICL1 is restricted, and the vertical wave component (so-called P-wave component) of the incident light ICL1 is transmitted. The P-wave component of the incident light ICL1 transmitted through the polarizing filter PLF1 (specifically, the P-wave (IR, R, G, B) of the front surface reflected light ICL11 and the P-wave (R) of the back surface reflected light ICL12) is focused by the lens LNS and imaged so that the P-wave component of the incident light ICL1 can be received on the imaging surface of the imaging element 14. In the visible light cut filter VCF1, the component having the wavelength band of the visible region of the light transmitted through the polarizing filter PLF1 (that is, the P-wave (IR,R,G,B) of the front surface reflected light ICL11 and the P-wave (R) of the back surface reflected light ICL12 is cut, and the remaining component having the wavelength band in the near-infrared region is transmitted. The light transmitted through the visible light cut filter VCF1 (specifically, P-wave (IR) of the front surface reflected light ICL11) is received by the imaging element 14 and imaged.

Figure 9:
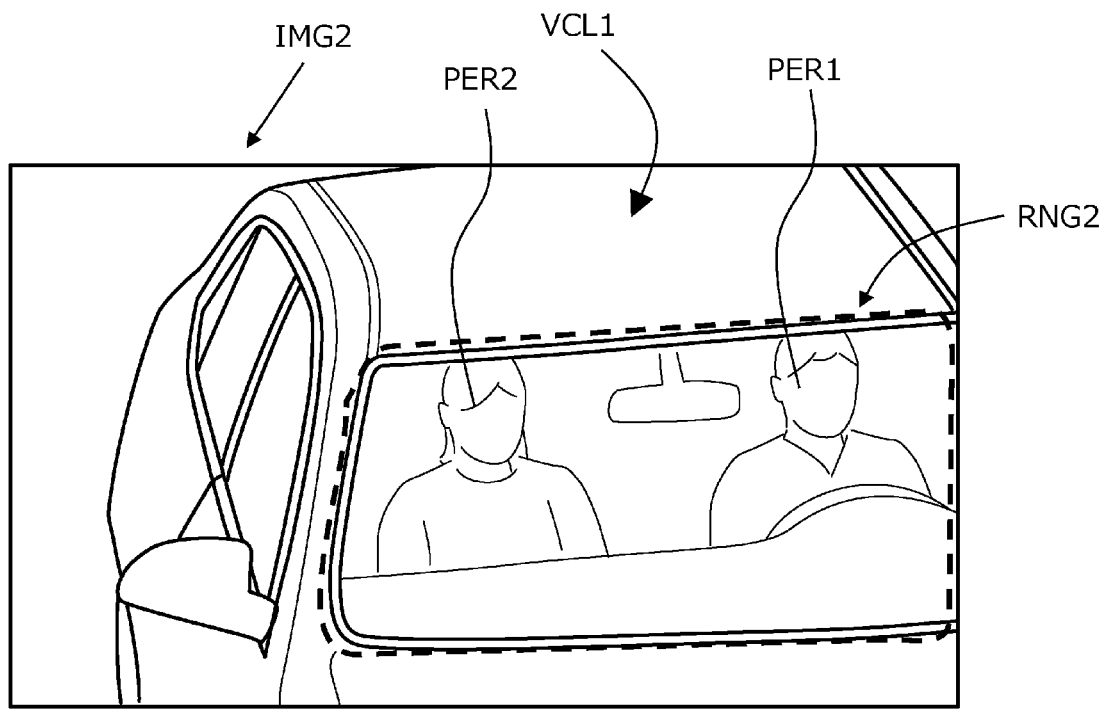
FIG. 9 is a diagram showing an example of captured image data imaged by the vehicle imaging camera according to the first embodiment.

Accordingly, the vehicle imaging camera 10 can cut the S-wave component having the wavelength band in the visible region of each of the front surface reflected light ICL11 and the back surface reflected light ICL12 on the car film CFLM1 included in the incident light ICL1, which causes the rainbow RNBW1, and can generate the captured image data in which the face of the occupant such as the driver in the vehicle VCL1 appears on the windshield FRG1 (see FIG. 9).

FIG. 9 is a diagram showing an example of captured image data IMG2 imaged by the vehicle imaging camera 10 according to the first embodiment. As shown in FIG. 9, since the rainbow RNBW1 (see FIG. 8) does not appear on substantially an entire windshield portion RNG2, it is possible to image faces of occupants PER1 and PER2 such as the driver in the vehicle VCL1, and it is possible to determine the faces of the occupants PER1 and PER2 in the vehicle imaging camera 10 or a receiver that receives the captured image data IMG2 from the vehicle imaging camera 10. For example, when the person (criminal) who causes the incident or the accident gets in the vehicle VCL1 and escapes, even if the police analyzes the captured image data IMG2 of the vehicle imaging camera 10, the face of the criminal can be imaged, and thus the criminal can be specified early, and the investigation efficiency by the police can be improved. Accordingly, the vehicle imaging camera 10 can support improvement in the image quality of the face of the occupant in the vehicle VCL1 as the subject.

Figure 5:
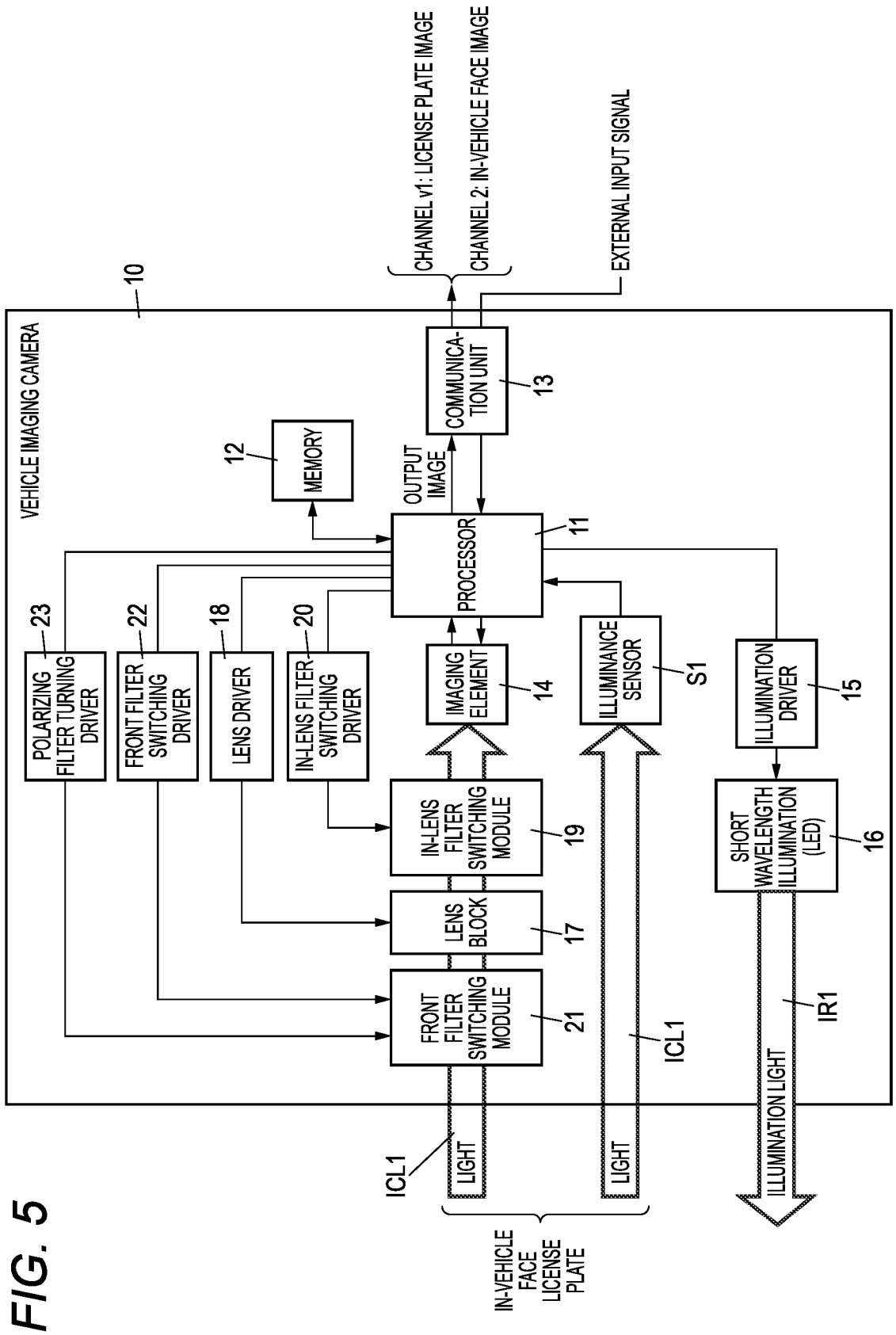
FIG. 5 is a block diagram showing a hardware configuration example of the vehicle imaging camera in detail according to the first embodiment.

FIG. 5 is a block diagram showing a hardware configuration example of the vehicle imaging camera 10 in detail according to the first embodiment. The vehicle imaging camera 10 includes a processor 11, a memory 12, a communication unit 13, the imaging element 14, an illumination driver 15, the short wavelength illumination 16, the lens block 17, a lens driver 18, the in-lens filter switching module 19, an in-lens filter switching driver 20, the front filter switching module 21, a front filter switching driver 22, a polarizing filter turning driver 23, and an illuminance sensor S1.

The processor 11 is configured by, for example, a central processing unit (CPU), a digital signal processor (DSP), or a field-programmable gate array (FPGA). The processor 11 functions as a controller that controls an overall operation of the vehicle imaging camera 10. The processor 11 executes a control processing of controlling an operation of each unit of the vehicle imaging camera 10, a data input and output processing among units of the vehicle imaging camera 10, a data calculation processing, and a data storage processing. The processor 11 is operated in accordance with a program stored in the memory 12. The processor 11 uses the memory 12 during an operation, and temporarily stores data or information generated or acquired by the processor 11 in the memory 12.

The memory 12 is implemented by a random access memory (RAM), a read only memory (ROM), and the like. The memory 12 temporarily stores a program necessary for executing an operation of the vehicle imaging camera 10, and further temporarily stores data or information generated during the operation. The RAM is, for example, a work memory used in the operation of the vehicle imaging camera 10. The ROM stores in advance and holds, for example, a program for controlling the vehicle imaging camera 10.

The communication unit 13 can communicate with the receiver (not shown) via a wired communication line or a wireless network (for example, a wireless LAN such as Wi-Fi (registered trademark), Bluetooth (registered trademark), or WiGig). The communication unit 13 transmits, to a setting terminal 30, a captured image under the first imaging condition suitable for imaging the face of the occupant in the vehicle (also referred to as a "in-vehicle face image" in some cases) as a channel 1. The communication unit 13 transmits, for example, to the receiver, a captured image under the second imaging condition suitable for imaging the license plate of the vehicle (also referred to as a "license plate image" in some cases) as a channel 2.

The communication unit 13 receives an external input signal transmitted from the receiver and outputs the external input signal to the processor 11. The external input signal is, for example, a command to change a camera parameter of the vehicle imaging camera 10 by an operation of an operator who views an installation setting screen (not shown) displayed on the receiver. Here, the camera parameter may include, and is not limited to, for example, an exposure time by an electronic shutter, a gain for amplifying an electric signal of the captured image by the imaging element 14, and an intensity of illumination from the short wavelength illumination 16. The processor 11 changes and sets a value of the corresponding camera parameter according to the external input signal. The set camera parameter is set to the imaging element 14 or the short wavelength illumination 16 in accordance with contents thereof.

The imaging element 14 is an image sensor capable of imaging a high-definition image such as 2K, 4K, or 8K, for example, and is implemented by a solid-state imaging element such as a charged coupled device (CCD) or a complementary metal oxide semiconductor (CMOS), for example. The solid-state imaging element generates an electric signal of a captured image based on photoelectric conversion of the incident light (see FIG. 2 or 4) imaged on the imaging surface. In addition, the imaging element 14 may be implemented by an integrated circuit board on which the above solid-state imaging element, an amplifier for amplifying an electric signal output from the solid-state imaging element, a gain adjustment unit capable of adjusting a gain (sensitivity) of the amplifier, an electronic shutter (also simply referred to as a "shutter" in some cases) capable of controlling an imaging time (so-called exposure time), and an exposure control circuit for controlling the exposure time of the electronic shutter are mounted. An output of the imaging element 14 may be input to the processor 11 and a predetermined signal processing may be executed to generate data of the captured image, or the imaging element 14 may be provided with a control circuit for executing the above predetermined signal processing to generate the data of the captured image.

The illumination driver 15 is implemented by a switching circuit or the like for switching ON or OFF of each of a plurality of short wavelength illuminations 16. The illumination driver 15 switches ON or OFF of each of the short wavelength illuminations 16 in accordance with a control instruction from the processor 11. The illumination driver 15 may further include a variable amplifier circuit or the like capable of adjusting light emission amount (intensity) of the short wavelength illumination 16. In this case, the illumination driver 15 can adjust the light emission amount (intensity) of the short wavelength illumination 16 in accordance with the control instruction from the processor 11.

The short wavelength illumination 16 is implemented by, for example, a light emission diode (LED), and a plurality of short wavelength illuminations 16 (for example, about 10 to 20) are arranged. The short wavelength illumination 16 irradiates with IR light (near-infrared light), which is illumination light having an intensity according to the control of the illumination driver 15, in order to enable imaging of a subject (for example, a vehicle) within an angle of view while an operation mode of the vehicle imaging camera 10 is the nighttime mode. The short wavelength illumination 16 allows the operation mode of the vehicle imaging camera 10 being not limited to the nighttime mode but the daytime mode, the short wavelength illumination 16 irradiates with the IR light (near-infrared light), which is the illumination light having the intensity according to the control of the illumination driver 15, in order to enable imaging of the subject (for example, the vehicle) within the angle of view. This is because, as described with reference to FIG. 4, imaging is performed based on only the IR light received by the imaging element 14 in order to prevent the rainbow RNBW1 from being reflected, and thus, by irradiating with the IR light from the short wavelength illumination 16 even in the daytime, a shortage of a light amount of the IR light suitable for the imaging is compensated. That is, by preventing the reflection of the rainbow RNBW1 in the near-infrared region, the illumination of the IR light can be turned on even in the daytime to assist brightness inside the vehicle.

The lens block 17 includes a focus lens that images an optical image of a subject on the imaging surface of the imaging element 14 by focusing according to a distance from the vehicle imaging camera 10 to the subject, and a zoom lens that can change a magnification from a telephoto lens to a wide angle lens. Each of a position of the focus lens and a position of the zoom lens in the lens block 17 is included as an example of the camera parameter, and is stored in the memory 12. The position of the focus lens and the position of the zoom lens are calculated by the processor 11 using information transmitted from the receiver when the vehicle imaging camera 10 is installed. In addition, a different value is used for the position of the focus lens depending on the operation mode (specifically, the daytime mode or the nighttime mode) of the vehicle imaging camera 10.

The lens driver 18 is configured by an electric circuit for adjusting the position of the lens (for example, the focus lens or the zoom lens) forming the lens block 17. The lens driver 18 adjusts the position of the focus lens in the lens block 17 in accordance with a control instruction from the processor 11. The lens driver 18 may change a zoom magnification by adjusting the position of the zoom lens in accordance with a control instruction from the processor 11.

The in-lens filter switching module 19 is disposed behind the lens block 17 (that is, on an opposite object side) and in front of the imaging element 14 (that is, on an objective side). In the in-lens filter switching module 19, the visible light cut filter VCF1 and plain glass (not shown) can be switched, and the visible light cut filter VCF1 and the plain glass are alternately switched and disposed on an optical axis of an optical system. The in-lens filter switching module 19 disposes the visible light cut filter VCF1 on the optical axis, for example, during the daytime mode. Accordingly, in the daytime mode, the imaging element 14 receives light in which visible light that induces rainbow reflection is blocked, and a captured image with good image quality is obtained. On the other hand, the in-lens filter switching module 19 disposes the plain glass on the optical axis, for example, during the nighttime mode. Accordingly, in the nighttime mode, the imaging element 14 receives the incident light in which a component of an IR band passes through the plain glass, and an IR image having a constant brightness (in other words, not becoming too dark) based on the received incident light is obtained.

The in-lens filter switching driver 20 is configured by an electric circuit for driving the in-lens filter switching module 19. In accordance with a control instruction from the processor 11, the in-lens filter switching driver 20 drives the in-lens filter switching module 19, and disposes either the visible light cut filter VCF1 or the plain glass on the optical axis.

Figure 10:
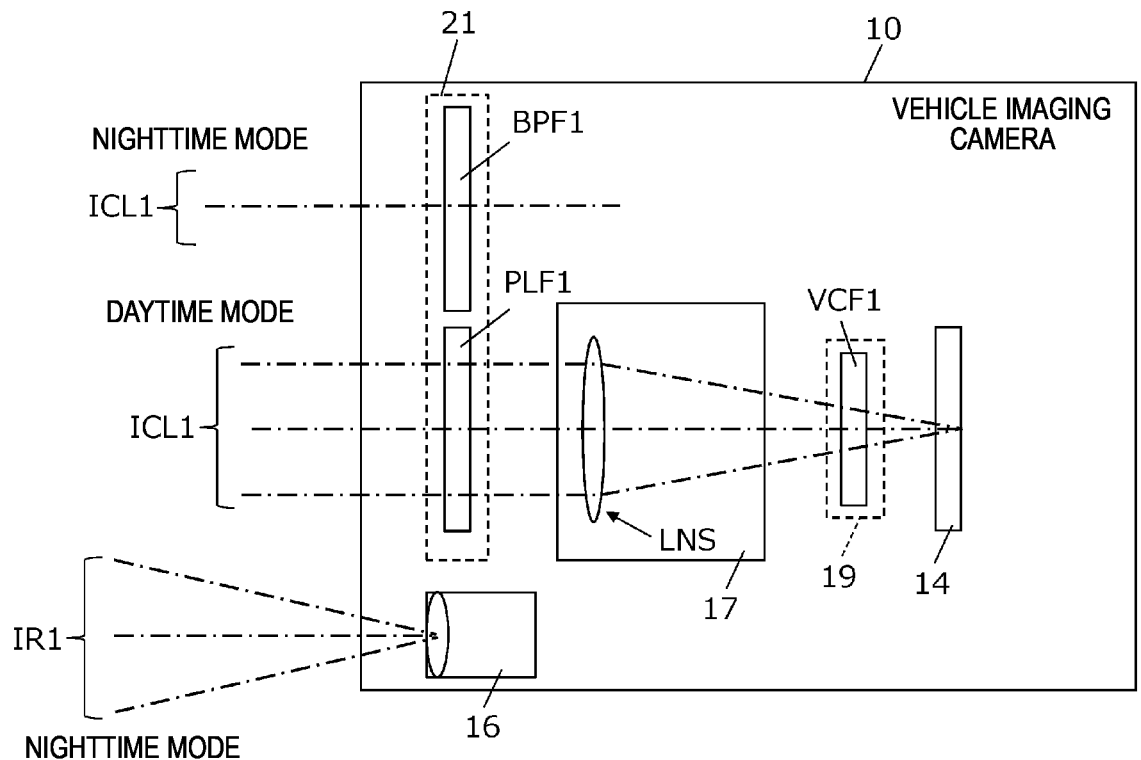
FIG. 10 is a plan view showing an example of switching of optical filters by a front filter switching module.

The front filter switching module 21 alternately switches between the band-pass filter as an example of the optical filter and the polarizing filter PLF1 as an example of the optical filter (for example, slides in a left-right direction shown in FIG. 11), and disposes the band-pass filter or the polarizing filter PLF1 on the optical axis (see FIG. 10). Since the front filter switching module 21 is disposed on a subject side (that is, the objective side) on the optical axis with respect to the lens block 17, mechanical adjustment (for example, maintenance) of the front filter switching module 21 is facilitated.

The front filter switching driver 22 is configured by an electric circuit for driving a front filter switching module motor (not shown). In accordance with a control instruction from the processor 11, the front filter switching driver 22 moves the front filter switching module 21 by driving the front filter switching module motor (not shown), and disposes the band-pass filter BPF1 or the polarizing filter PLF1 on the optical axis.

The polarizing filter turning driver 23 is configured by an electric circuit for driving a polarizing filter rotating motor (not shown). In accordance with a control instruction from the processor 11, the polarizing filter turning driver 23 drives the polarizing filter rotating motor (not shown), rotates a polarizing axis of the polarizing filter PLF1 disposed on the optical axis by a predetermined angle (for example, a declination θp described later) about the optical axis. An amount of light transmitted through the polarizing filter PLF1 is restricted by tilting the polarizing axis of the polarizing filter.

The polarizing filter PLF1 is rotatable within a mechanical rotation range (that is, a mechanical stroke). When a rotation of the polarizing filter rotating motor (not shown) is accelerated after the polarizing filter rotating motor (not shown) is started, an angular speed of the polarizing filter rotating motor (not shown) gradually increases and reaches a constant angular speed. In this case, the polarizing filter PLF1 shifts from acceleration to a range in which the polarizing filter PLF1 can rotate at a constant speed (that is, a soft stroke).

On the other hand, when the rotation of the polarizing filter rotating motor (not shown) is decelerated, the angular speed of the polarizing filter rotating motor (not shown) gradually decreases to 0 (zero). The polarizing filter PLF1 rotates from a constant speed at a reduced speed. The range (that is, the soft stroke) in which the polarizing filter PLF1 can rotate at a constant speed can be optionally adjusted by a torque of the polarizing filter rotating motor (not shown). An angle (declination) of the polarizing axis of the polarizing filter PLF1 is adjusted according to an amount of rotation of the polarizing filter PLF1 from an origin detected by a polarizing filter rotation origin sensor (not shown). In the first embodiment, the declination of the polarizing filter PLF1 is included as an example of the camera parameter, and is stored in the memory 12. Although details will be described later, the declination of the polarizing filter PLF1 is calculated by the processor 11 using information transmitted from the receiver when the vehicle imaging camera 10 is installed.

The illuminance sensor S1 as an example of a sensor detects illuminance of light from surroundings of the vehicle imaging camera 10. As the illuminance sensor S1, for example, a photodiode or a phototransistor is used. The illuminance sensor S1 is installed to a front of a housing of the vehicle imaging camera 10 so as to be able to detect illuminance of light in a direction in which the vehicle exists as the subject of the vehicle imaging camera 10. Illuminance information (specifically, illuminance value data) detected by the illuminance sensor S1 is input to the processor 11. The processor 11 determines whether an operation mode of the vehicle imaging camera 10 at a current time point is the daytime mode or the nighttime mode based on the illuminance information.

For example, when the processor 11 determines that the illuminance information is higher than a predetermined threshold value (in other words, a surrounding is bright), the processor 11 sets the operation mode of the vehicle imaging camera 10 to shift to the daytime mode. When the processor 11 determines that the illuminance information is lower than the predetermined threshold value (in other words, the surrounding is dark), the processor 11 sets the operation mode of the vehicle imaging camera 10 to shift to the nighttime mode. When the illuminance information at a current time point does not become higher or lower than the predetermined threshold value, the operation mode at the current time point is maintained. Information (for example, a flag) indicating the daytime mode or the nighttime mode is temporarily held in, for example, the memory 12.

Figure 6:
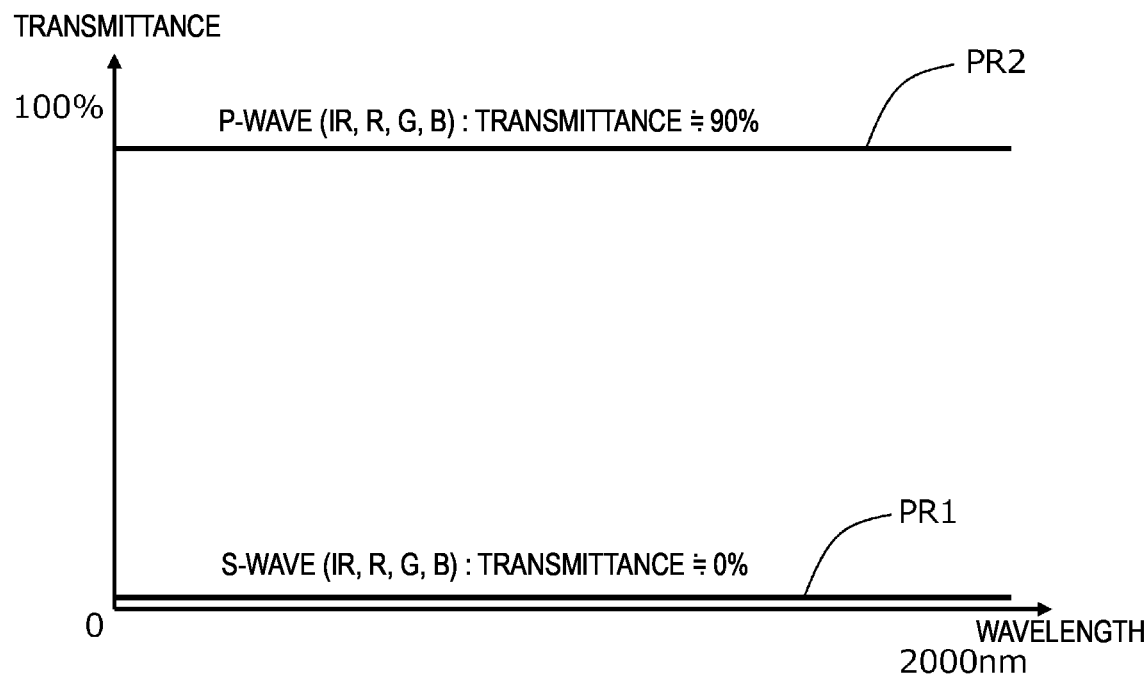
FIG. 6 is a diagram showing a characteristic example of a polarizing filter.

FIG. 6 is a diagram showing a characteristic example of the polarizing filter PLF1. A horizontal axis of the diagram in FIG. 6 represents a wavelength (nm), and a vertical axis of the diagram in FIG. 6 represents a transmittance (%). The wavelength indicates, for example, from a visible region to a near-infrared region (about 2000 nm). According to a characteristic PR1 of the polarizing filter PLF1, a transmittance of the S-wave component (for example, S-wave (IR, R, G, B)) of the light incident on the polarizing filter PLF1 is substantially 0%. On the other hand, according to a characteristic PR2 of the polarizing filter PLF1, a transmittance of the P-wave component (for example, P-wave (IR, R, G, B)) of the light incident on the polarizing filter PLF1 is substantially 90%. That is, transmission of the S-wave having a large reflectance is restricted by the polarizing filter PLF1 regardless of a wavelength band (that is, both in the visible region and in the near-infrared region), and the P-wave having a small reflectance is transmitted without being restricted by the polarizing filter PLF1 regardless of the wavelength band (see above).

Figure 7:
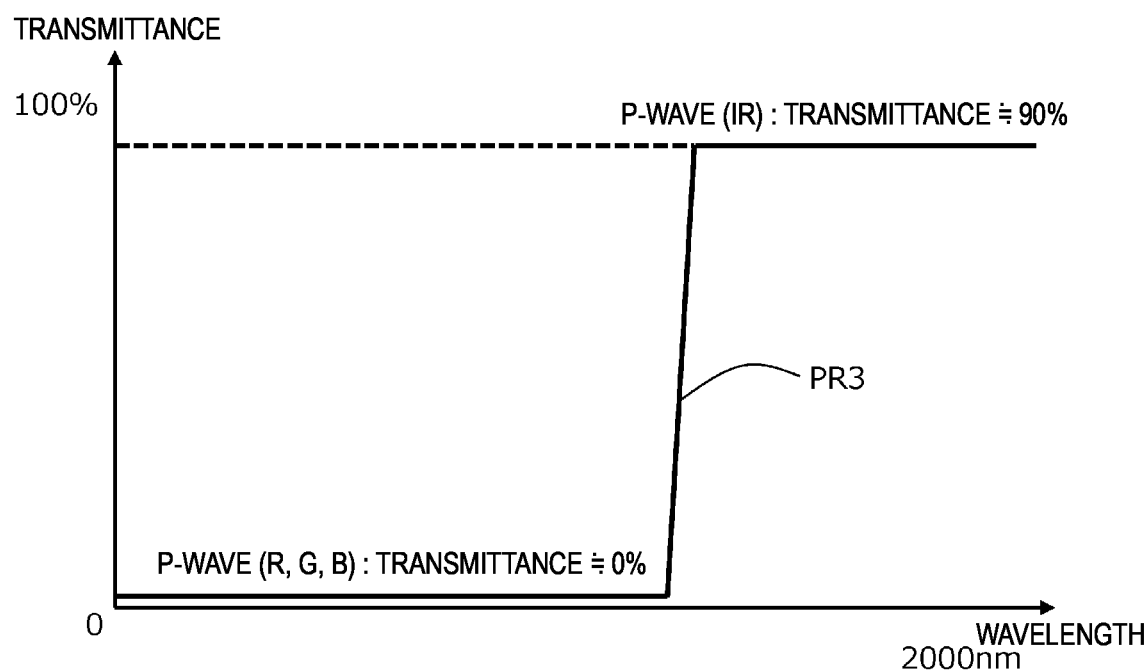
FIG. 7 is a diagram showing a characteristic example of a visible light cut filter.

FIG. 7 is a diagram showing a characteristic example of the visible light cut filter VCF1. A horizontal axis of the diagram in FIG. 7 represents a wavelength (nm), and a vertical axis of the diagram in FIG. 7 represents a transmittance (%). The wavelength indicates, for example, from the visible region to the near-infrared region (about 2000 nm). According to a characteristic PR3 of the visible light cut filter VCF1, a transmittance of the light in the visible region (for example, P-wave (R, G, B)) incident on the visible light cut filter VCF1 is substantially 0%, and a transmittance of the light in the near-infrared region (for example, P-wave (IR)) incident on the visible light cut filter VCF1 is substantially 90%. That is, the light in the visible region which can cause the rainbow RNBW1 is cut by the visible light cut filter VCF1, and the light in the near-infrared region which does not cause the rainbow RNBW1 can pass through the visible light cut filter VCF1 to be received by the imaging element 14.

Figure 11:
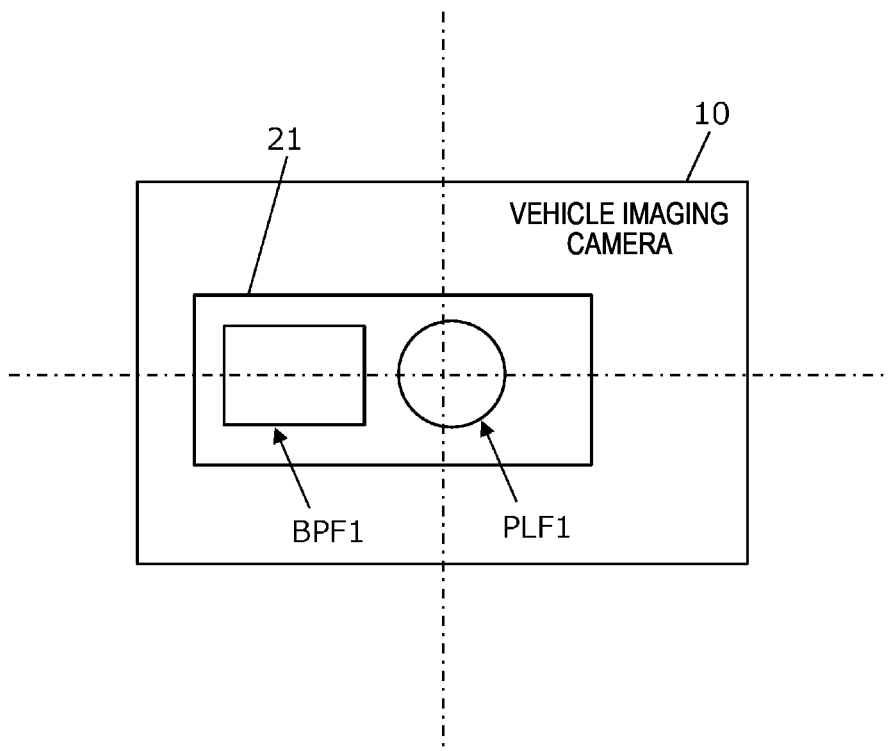
FIG. 11 is a front view showing an example of switching of the optical filters by the front filter switching module.

FIG. 10 is a plan view showing an example of switching of optical filters by the front filter switching module 21. FIG. 11 is a front view showing an example of switching of the optical filters by the front filter switching module 21. In descriptions of FIGS. 10 and 11, components that overlap with a description of FIG. 1 or 10 are denoted by the same reference signs, a description thereof is simplified or omitted, and different contents will be described.

The band-pass filter BPF1 shown in FIG. 10 is disposed on the front side of the lens LNS and on the optical axis in the nighttime mode (that is, a determination result of the operation mode by the processor 11 based on an output of the illuminance sensor S1). The band-pass filter BPF1 cuts, for example, the incident light ICL1 having a wavelength band in the visible region, and transmits the incident light ICL1 having a wavelength band in the near-infrared region. The polarizing filter PLF1 shown in FIG. 10 is disposed on the front side of the lens LNS and on the optical axis in the daytime mode (that is, a determination result of the operation mode by the processor 11 based on an output of the illuminance sensor S1). The polarizing filter PLF1 cuts the S-wave component having a large reflectance in the incident light ICL1, and transmits the P-wave component having a small reflectance in the incident light ICL1.

As shown in FIG. 11, in the vehicle imaging camera 10, the front filter switching module 21 slides in the left-right direction based on the control by the processor 11 and the front filter switching driver 22, so that either the band-pass filter BPF1 or the polarizing filter PLF1 is disposed in front of the lens LNS. Although FIG. 11 shows an example in which the front filter switching module 21 slides in the left-right direction, a sliding direction of the front filter switching module 21 is not limited to the left-right direction as long as either the band-pass filter BPF1 or the polarizing filter PLF1 is disposed in front of the lens LNS. For example, by rotating the band-pass filter BPF1 and the polarizing filter PLF1, either the band-pass filter BPF1 or the polarizing filter PLF1 may be disposed in front of the lens LNS.

Figure 12:
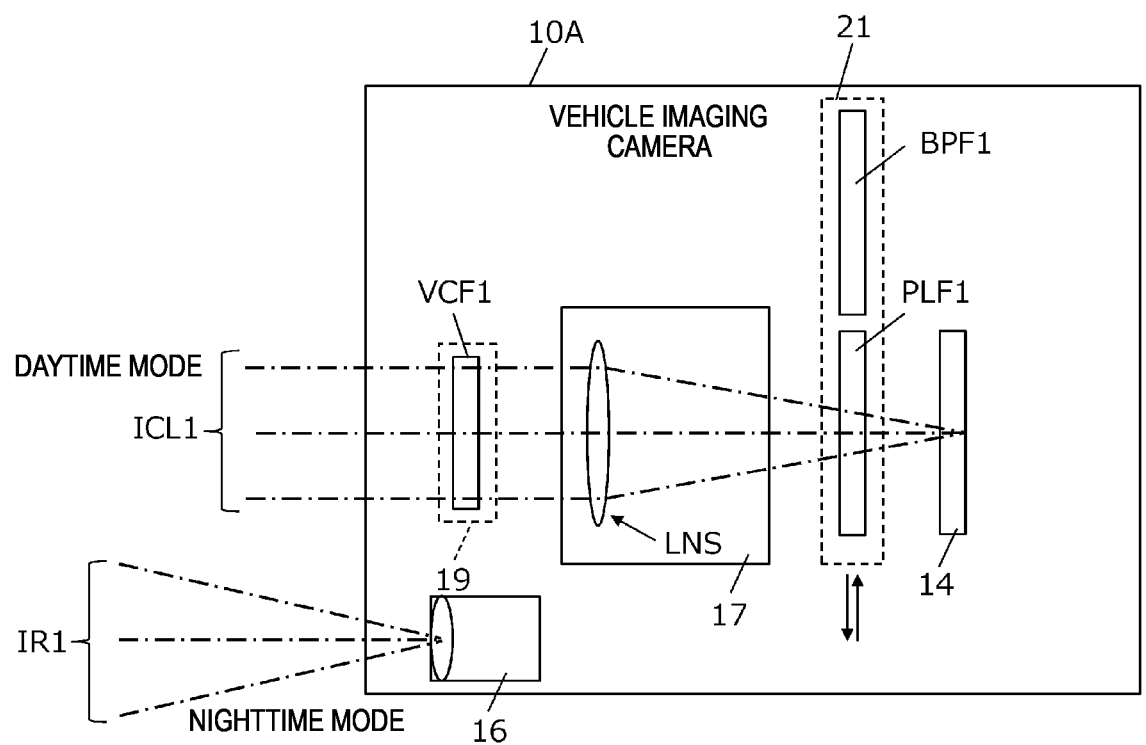
FIG. 12 is a diagram showing another arrangement example of the lens and the optical filters in a vehicle imaging camera according to the first embodiment.

FIG. 12 is a diagram showing another arrangement example of the lens LNS and the optical filter in the vehicle imaging camera 10 according to the first embodiment. In a description of FIG. 12, components that overlap with the description of FIG. 1 or 10 are denoted by the same reference signs, a description thereof is simplified or omitted, and different contents will be described.

In the arrangement example of FIG. 12, unlike the arrangement example of FIG. 1, the vehicle imaging camera 10A includes the in-lens filter switching module 19 in which the visible light cut filter VCF1 can be disposed on the front side of the lens LNS, the lens block 17 in which the lens LNS is accommodated, the front filter switching module 21 in which the polarizing filter PLF1 can be disposed on the front side of the imaging element 14, the imaging element 14, and the short wavelength illumination 16. Details of individual components are described with reference to FIG. 5, and a detailed description thereof is omitted. In the arrangement example of FIG. 12, with reference to the lens LNS, the visible light cut filter VCF1 is disposed on the front side of the lens LNS, and the polarizing filter PLF1 is disposed on the rear side of the lens LNS.

Figure 13:
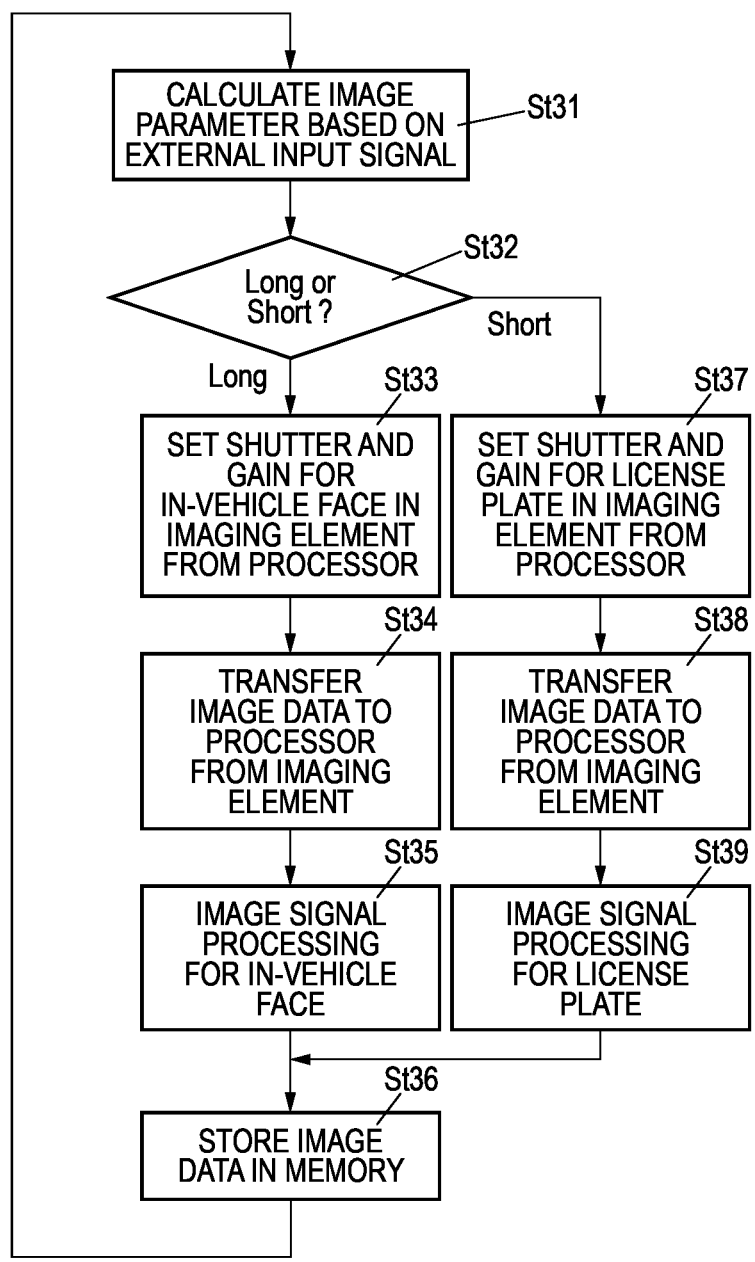
FIG. 13 is a flowchart showing an example of an operation procedure related to imaging of the vehicle imaging camera according to the first embodiment.
Figure 14:
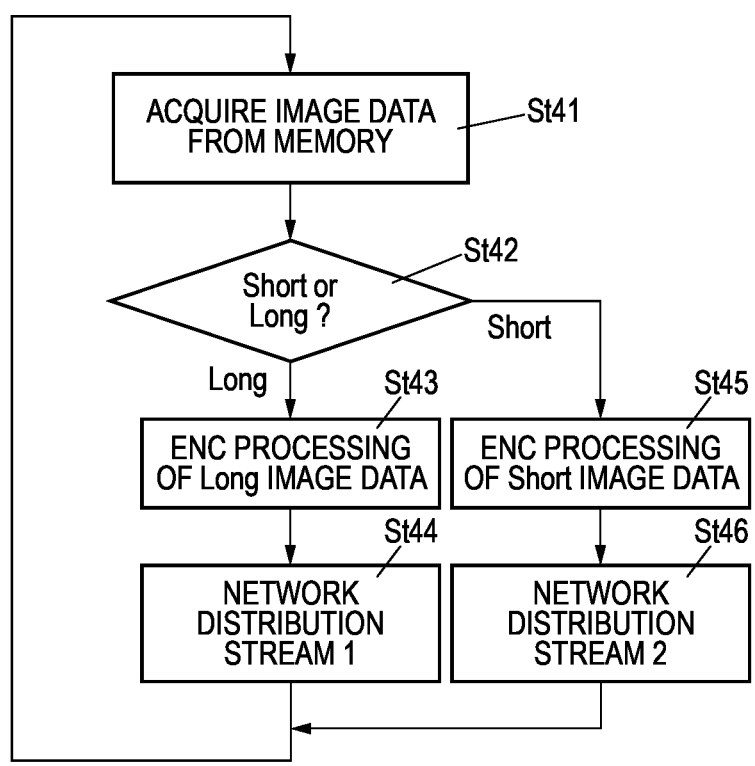
FIG. 14 is a flowchart showing an example of an operation procedure related to data transmission of the vehicle imaging camera according to the first embodiment.
Figure 15:
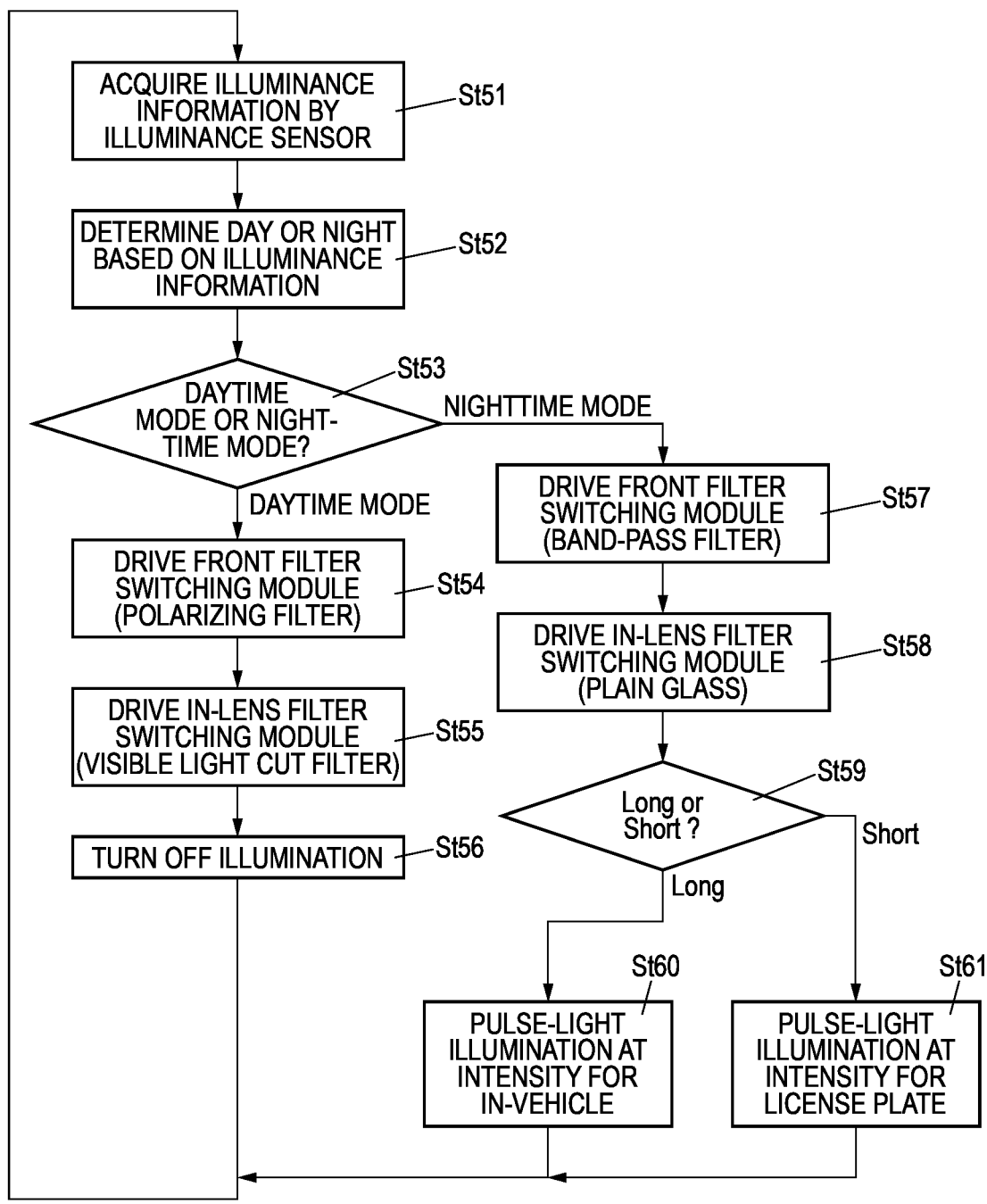
FIG. 15 is a flowchart showing an example of an operation procedure related to illumination control of the vehicle imaging camera according to the first embodiment.
Figure 16:
FIG. 16 is a table showing various operation control examples in each of a daytime mode and a nighttime mode.

FIG. 13 is a flowchart showing an example of an operation procedure related to imaging of the vehicle imaging camera 10 according to the first embodiment. FIG. 14 is a flowchart showing an example of an operation procedure related to data transmission of the vehicle imaging camera 10 according to the first embodiment. FIG. 15 is a flowchart showing an example of an operation procedure related to illumination control of the vehicle imaging camera 10 according to the first embodiment. FIG. 16 is a table showing various operation control examples in each of the daytime mode and the nighttime mode.

A processing shown in FIG. 13 is repeatedly executed, for example, until power of the vehicle imaging camera 10 is turned on and the power is turned off. In FIG. 13, the processor 11 calculates the image parameter of the first imaging condition or the image parameter of the second imaging condition based on the external input signal from the communication unit 13 (St31), and sets a calculation result (image parameter) in the memory 12. The vehicle imaging camera 10 images while switching between the license plate image and the in-vehicle face image in a time division manner (for example, frame by frame). At this time, for example, the processor 11 images a license plate image as an odd-numbered frame (captured image), and images an in-vehicle face image as an even-numbered frame (captured image).

After step St31, the processor 11 determines whether an exposure time of the electronic shutter of the imaging element 14 is "Long" or "Short" (St32).

When imaging the even-numbered frame, the processor 11 determines that an exposure time of the electronic shutter corresponding to the in-vehicle face image is "Long" (St32, Long), and sets the image parameter (for example, an exposure time of the electronic shutter and a gain) suitable for imaging the in-vehicle face image in the imaging element 14 (St33). The imaging element 14 transfers data of the in-vehicle face image to the processor 11 based on the image parameter set in step St33 (St34). The processor 11 performs a predetermined signal processing (for example, noise removal, white balance, and image compression) on the data of the in-vehicle face image from the imaging element 14 (St35), and temporarily stores the data of the in-vehicle face image subjected to the signal processing in the memory 12 (St36). After step St36, the processing of the vehicle imaging camera 10 returns to step St31.

On the other hand, when imaging the odd-numbered frame, the processor 11 determines that an exposure time of the electronic shutter corresponding to the license plate image is "Short" (St32, Short), and sets the image parameter (for example, an exposure time of the electronic shutter and a gain) suitable for imaging the license plate image in the imaging element 14 (St37). The imaging element 14 transfers data of the license plate image to the processor 11 based on the image parameter set in step St37 (St38). The processor 11 performs a predetermined signal processing (for example, noise removal, white balance, and image compression) on the data of the license plate image from the imaging element 14 (St39), and temporarily stores the data of the license plate image subjected to the signal processing in the memory 12 (St36). Accordingly, the vehicle imaging camera 10 can switch between the image parameter for the in-vehicle face image and the image parameter for the license plate image for each frame, generate the in-vehicle face image imaged under the image parameter suitable for imaging the face of the occupant in the vehicle, and generate the license plate image imaged under the image parameter suitable for imaging the license plate.

A processing shown in FIG. 14 is repeatedly executed, for example, until the power of the vehicle imaging camera 10 is turned on and the power is turned off. In FIG. 14, the processor 11 reads and acquires the data of the in-vehicle face image or the data of the license plate image temporarily stored in step St36 (St41).

The processor 11 determines whether the exposure time of the electronic shutter of the imaging element 14 corresponding to the image data acquired in step St41 is "Long" or "Short" (St42).

When the processor 11 determines that the exposure time is "Long" (St42, Long), the processor 11 performs an encoding processing suitable for the exposure time (St43). For example, when the processor 11 acquires the face of the occupant through the windshield FRG1 of the vehicle VCL1 as a clear face image, the processor 11 performs the encoding processing at a low compression rate. The processor 11 distributes the data of the in-vehicle face image subjected to the encoding processing in step St43 as a stream 1 to the receiver (not shown) of a destination via the communication unit 13 (St44). After step St44, the processing of the vehicle imaging camera 10 returns to step St41.

On the other hand, when the processor 11 determines that the exposure time is "Short" (St42, Short), the processor 11 performs an encoding processing suitable for the exposure time (St45). For example, when acquiring the license plate image, the processor 11 may perform the encoding processing at a high compression rate. The processor 11 distributes the data of the license plate image subjected to the encoding processing in step St45 as a stream 2 to the receiver (not shown) of a destination via the communication unit 13 (St46). After step St46, the processing of the vehicle imaging camera 10 returns to step St41. Accordingly, the vehicle imaging camera 10 can perform an encoding processing at a compression rate corresponding to the data of the in-vehicle face image or the data of the license plate image in accordance with the exposure time of the electronic shutter of the imaging element 14, and distribute the data to a destination server (not shown).

A table TBL1 shown in FIG. 16 is registered in advance in, for example, the memory 12. In the table TBL1, in the daytime mode, instruction information is instructed so that the front filter switching module 21 disposes the polarizing filter PLF1 on the optical axis, the in-lens filter switching module 19 disposes the visible light cut filter VCF1 on the optical axis, and the short wavelength illumination 16 is turned off. On the other hand, in the nighttime mode, instruction information is instructed so that the front filter switching module 21 disposes the band-pass filter BPF1 on the optical axis, the in-lens filter switching module 19 disposes the plain glass on the optical axis, and the short wavelength illumination 16 is turned on. Switching to the daytime mode or the nighttime mode shown in FIG. 16 is performed by the processor 11 based on instruction contents of the table TBL1.

A processing shown in FIG. 15 is repeatedly executed, for example, until the power of the vehicle imaging camera 10 is turned on and the power is turned off. In FIG. 15, the processor 11 acquires surrounding illuminance information detected by the illuminance sensor S1 (St51). The processor 11 determines whether a current time point is daytime (for example, morning or daytime) or nighttime (for example, evening or nighttime) based on the illuminance information acquired in step St51 (St52).

The processor 11 determines whether the operation mode of the vehicle imaging camera 10 is set to the daytime mode or the nighttime mode based on a determination result of step St52 (St53). For example, the memory 12 stores and holds a threshold value for a predetermined illuminance, and the processor 11 sets the operation mode to the daytime mode if the illuminance is higher than the threshold value and sets the operation mode to the nighttime mode if the illuminance is lower than the threshold value.

In the case of the daytime mode (St53, daytime mode), based on the table TBL1 shown in FIG. 16, the processor 11 generates a control instruction for executing a processing in the daytime mode, sends the control instruction to the front filter switching driver 22, and drives the front filter switching module 21 via the front filter switching driver 22 (St54). In the daytime mode, the front filter switching module 21 moves so that the polarizing filter PLF1 is positioned on the optical axis. In addition, the processor 11 sends the control instruction for the daytime mode to the in-lens filter switching driver 20, and drives the in-lens filter switching module 19 via the in-lens filter switching driver 20 (St55). In the daytime mode, the in-lens filter switching module 19 moves so that the visible light cut filter VCF1 is positioned on the optical axis, for example, so that the rainbow does not appear in the image imaged by the imaging element 14. For example, in a region where technical measures for preventing the rainbow as in the first embodiment from appearing in the captured image are unnecessary, or in a case where RGB color images need to be preferentially imaged even when the rainbow appears, an IR cut filter (not shown) may be disposed on the optical axis in the in-lens filter switching module 19 so that a clear RGB image can be obtained in the daytime mode by using the IR cut filter.

In addition, the processor 11 similarly sends the control instruction for the daytime mode to the illumination driver 15, and turns off a plurality of short wavelength illuminations 16 via the illumination driver 15 (St56). After step St56, the processing of the vehicle imaging camera 10 returns to step St51.

On the other hand, in the case of the nighttime mode (St53, nighttime mode), based on the table TBL1 shown in FIG. 16, the processor 11 generates a control instruction for executing a processing in the nighttime mode, sends the control instruction to the front filter switching driver 22, and drives the front filter switching module 21 via the front filter switching driver 22 (St57). In the nighttime mode, the front filter switching module 21 moves so that the band-pass filter (not shown) is positioned on the optical axis. In addition, the processor 11 sends the control instruction for the nighttime mode to the in-lens filter switching driver 20, and drives the in-lens filter switching module 19 via the in-lens filter switching driver 20 (St58). In the nighttime mode, the in-lens filter switching module 19 moves so that the plain glass is positioned on the optical axis so as not to block the IR light incident on the vehicle imaging camera 10.

The processor 11 determines whether the exposure time of the electronic shutter of the imaging element 14 at the time of imaging is "Long" or "Short" (St59).

When imaging the even-numbered frame, the processor 11 determines that the exposure time of the electronic shutter corresponding to the in-vehicle face image is "Long" (St59, Long), sends a control instruction of an image parameter (for example, an intensity of the IR light from the short wavelength illumination 16) suitable for imaging the in-vehicle face image in the nighttime mode to the illumination driver 15, and pulse-lights the plurality of short wavelength illuminations 16 via the illumination driver 15 under the control instruction (St60). After step St60, the processing of the vehicle imaging camera 10 returns to step St51.

On the other hand, when imaging the odd-numbered frame, the processor 11 determines that the exposure time of the electronic shutter corresponding to the license plate image is "Short" (St59, Short), sends a control instruction of an image parameter (for example, an intensity of the IR light from the short wavelength illumination 16) suitable for imaging the license plate image in the nighttime mode to the illumination driver 15, and pulse-lights the plurality of short wavelength illuminations 16 via the illumination driver 15 under the control instruction (St61). After step St61, the processing of the vehicle imaging camera 10 returns to step St51. Accordingly, the vehicle imaging camera 10 adaptively switches ON and OFF of the front filter switching module 21, the in-lens filter switching module 19, and the short wavelength illumination 16 according to the daytime mode or the nighttime mode, so that high-precision imaging can be implemented in both the daytime mode and the nighttime mode, and the in-vehicle face image and license plate image of the vehicle as the subject can be generated.

As described above, according to the first embodiment, the vehicle imaging camera 10 restricts, by the polarizing filter PLF1, the transverse wave component (for example, the S-wave component) of the incident light ICL1 (see FIG. 3 or 4) having light of a plurality of different wavelength bands generated based on birefringence in the car film CFLM1 from the vehicle VCL1 to which the car film CFLM1 is adhered. The vehicle imaging camera 10 includes the lens LNS on which the vertical wave component (for example, the P-wave component) of the incident light transmitted through the polarizing filter PLF1 is incident. The vehicle imaging camera 10 restricts the vertical wave component of the incident light in the visible region among the vertical wave component of the incident light imaged by the lens LNS by the visible light cut filter VCF1. The vehicle imaging camera 10 images the vehicle VCL1 as the subject with the imaging element 14 based on the vertical wave component of the incident light in the near-infrared region transmitted through the visible light cut filter VCF1.

Accordingly, the vehicle imaging camera 10 can effectively prevent an occurrence of the rainbow RNBW1 appearing on the windshield portion in the captured image data in which the windshield FRG1 of the vehicle VCL1 is a main subject, and can support improvement in the image quality of the face of the occupant such as the driver in the vehicle VCL1. Therefore, for example, when the person (criminal) who causes the incident or the accident gets in the vehicle VCL1 and escapes, even if the police analyzes the captured image data IMG2 (see FIG. 9) of the vehicle imaging camera 10, the face of the criminal can be imaged, and thus the criminal can be specified early, and the investigation efficiency by the police can be improved.

In addition, according to the first embodiment, the vehicle imaging camera 10 restricts, by the visible light cut filter VCF1, the incident light in the visible region among incident light ICL1 (see FIG. 3 or 4) having light of a plurality of different wavelength bands generated based on birefringence in the car film CFLM1 from the vehicle VCL1 to which the car film CFLM1 is adhered. The vehicle imaging camera 10 includes the lens LNS on which the incident light in the near-infrared region transmitted through the visible light cut filter VCF1 is incident. The vehicle imaging camera 10 restricts, by the polarizing filter PLF1, the transverse wave component (for example, the S-wave component) of the incident light in the near-infrared region among incident light in the near-infrared region imaged by the lens LNS. The vehicle imaging camera 10 images the vehicle VCL1 as the subject with the imaging element 14 based on the vertical wave component of the incident light in the near-infrared region transmitted through the polarizing filter PLF1.

Accordingly, the vehicle imaging camera 10 can effectively prevent the occurrence of the rainbow RNBW1 appearing on the windshield portion in the captured image data in which the windshield FRG1 of the vehicle VCL1 is the main subject, and can support the improvement in the image quality of the face of the occupant such as the driver in the vehicle VCL1. Therefore, for example, when the person (criminal) who causes the incident or the accident gets in the vehicle VCL1 and escapes, even if the police analyzes the captured image data IMG2 (see FIG. 9) of the vehicle imaging camera 10, the face of the criminal can be imaged, and thus the criminal can be specified early, and the investigation efficiency by the police can be improved.

The light having the plurality of different wavelength bands includes at least a first light (for example, the P-wave (IR, R, G, B) and the S-wave (IR, R, G, B)) having wavelength bands in the visible region and the near-infrared region reflected by the windshield FRG1 of the vehicle VCL1 and a second light (for example, the P-wave (R) and the S-wave (R)) having a single wavelength indicating any color component in the visible region generated by the birefringence in the car film CFLM1. Accordingly, the transmission of the S-wave component having a large reflectance is restricted by the polarizing filter PLF1, and the transmission of the light having the wavelength band in the visible region is restricted by the visible light cut filter VCF1. Therefore, the light having the wavelength band in the near-infrared region of the first light described above is received by the imaging element 14, and thus captured image data in which the rainbow appearance is prevented is obtained.

The first filter is the polarizing filter PLF1 that restricts transmission of the transverse wave component (for example, the S-wave component having a large reflectance) of the incident light. The second filter is the visible light cut filter VCF1 or the band-pass filter that cuts transmission of the light in the visible region. Accordingly, it is possible to prevent the imaging element 14 from receiving light having the wavelength band in the visible region and having a large reflectance, which may cause the rainbow RNBW1 appearing in the captured image data. Accordingly, by imaging of the imaging element 14 based on the P-wave (IR) in the near-infrared region, monochrome captured image data can be obtained, but imaging of the face of the occupant such as the driver existing through the windshield FRG1 becomes possible.

The third filter is the visible light cut filter VCF1 or the band-pass filter that cuts light in the visible region. The fourth filter is the polarizing filter PLF1 that restricts the transmission of the transverse wave component (for example, the S-wave component having a large reflectance) of the incident light. Accordingly, it is possible to prevent the imaging element 14 from receiving light having the wavelength band in the visible region and having a large reflectance, which may cause the rainbow RNBW1 appearing in the captured image data. Accordingly, by imaging of the imaging element 14 based on the P-wave (IR) in the near-infrared region, the monochrome captured image data can be obtained, but imaging of the face of the occupant such as the driver existing through the windshield FRG1 becomes possible.

The vehicle imaging camera 10 further includes the illuminance sensor S1 configured to detect the daytime mode, and the processor 11 configured to control driving of the first filter (for example, the polarizing filter PLF1) so that the first filter is disposed on the front side of the lens LNS when the daytime mode is detected. Accordingly, the vehicle imaging camera 10 can cut the S-wave component of the incident light ICL0 by the polarizing filter PLF1 in the daytime when the natural light such as the sunlight falls from the cloud CLD1, and can generate the captured image data of the vehicle VCL0 based on the P-wave component of the incident light ICL0. Accordingly, the vehicle imaging camera 10 can generate the captured image data with high image quality in which appearance of the cloud CLD1 is reduced (for example, the captured image data in which the face of the occupant such as the driver in the vehicle VCL0 appears).

The vehicle imaging camera 10 further includes the illuminance sensor S1 configured to detect the daytime mode, and the processor 11 configured to control driving of the fourth filter (for example, the polarizing filter PLF1) so that the fourth filter is disposed on the front side of the imaging element 14 when the daytime mode is detected. Accordingly, the vehicle imaging camera 10 can cut the S-wave component of the incident light ICL0 by the polarizing filter PLF1 in the daytime when the natural light such as the sunlight falls from the cloud CLD1, and can generate the captured image data of the vehicle VCL0 based on the P-wave component of the incident light ICL0. Accordingly, the vehicle imaging camera 10 can generate the captured image data with high image quality in which appearance of the cloud CLD1 is reduced (for example, the captured image data in which the face of the occupant such as the driver in the vehicle VCL0 appears).

Although the various embodiments are described above with reference to the drawings, it is needless to say that the present disclosure is not limited to such examples. It will be apparent to those skilled in the art that various alterations, modifications, substitutions, additions, deletions, and equivalents can be conceived within the scope of the claims, and it should be understood that such changes also belong to the technical scope of the present invention. Components in the various embodiments mentioned above may be combined optionally in the range without deviating from the spirit of the invention.

The present disclosure is useful as a camera device that effectively prevents an occurrence of a rainbow reflected on a windshield portion of a captured image in which a windshield of a vehicle is a main subject, and supports improvement in image quality of a face of an occupant.

What is claimed is:
1. A camera device, comprising:
   a processor;
   a sensor configured to detect illuminance of light from surroundings of the camera device;

a first filter configured to restrict a transverse wave component of incident light, the incident light having light of a plurality of different wavelength bands generated based on birefringence;

a third filter configured to restrict a wavelength band of the incident light in a visible region, and to transmit a wavelength band of the incident light in a near-infrared region;

a lens on which a vertical wave component of the incident light, transmitted through the first filter, or the incident light in the near-infrared region, transmitted through the third filter, is incident;

a second filter configured to restrict the vertical wave component of the incident light in a visible region among the vertical wave component of the incident light, transmitted through the lens; and an imaging element configured to image a subject based on the vertical wave component of the incident light, transmitted through the second filter, in the near-infrared region, wherein the first filter and the third filter are disposed on a front side of the lens, and the second filter is disposed on a rear side of the lens, when the illuminance of light detected by the sensor is higher than a predetermined threshold value, the processor is configured to set an operation mode of the camera device to a daytime mode and to dispose the first filter on the front side of the lens, and when the illuminance of light detected by the sensor is lower than the predetermined threshold value, the processor is configured to set the operation mode of the camera device to a nighttime mode and to dispose the third filter on the front side of the lens.

2. The camera device according to claim 1, wherein:
the incident light having the plurality of different wavelength bands includes a first light having wavelength bands in the visible region and the near-infrared region and a second light having a single wavelength indicating any color component in the visible region, the second light being generated by the birefringence.

3. The camera device according to claim 1, wherein:
the first filter is a polarizing filter that restricts the transverse wave component of the incident light; and
the second filter is a visible light cut filter or a band-pass filter that cuts light in the visible region.

4. The camera device according to claim 1, wherein the processor is configured to control driving of the first filter when the daytime mode is detected.

5. The camera device according to claim 1, wherein the incident light is generated based on the birefringence by a car film of a vehicle to which the car film is adhered, and
a face of an occupant of the vehicle is imaged as the subject.

6. A camera device, comprising:
a processor;

a sensor configured to detect illuminance of light from surroundings of the camera device;

a second filter configured to restrict a vertical wave component of incident light in a visible region, the incident light having light of a plurality of different wavelength bands and being generated based on birefringence;

a lens on which the incident light, transmitted through the second filter, is incident;

a first filter configured to restrict a transverse wave component of the incident light, transmitted through the lens;

a third filter configured to restrict a wavelength band of the incident light in the visible region, and to transmit a wavelength band of the incident light in the near-infrared region; and an imaging element configured to image a subject based on a vertical wave component of the incident light in the near-infrared region, transmitted through one of the first filter and the third filter, wherein the second filter is disposed on a front side of the lens, and the first filter and the third filter are disposed on a rear side of the lens, when the illuminance of light detected by the sensor is higher than a predetermined threshold value, the processor is configured to set an operation mode of the camera device to a daytime mode and to dispose the first filter on the rear side of the lens, and when the illuminance of light detected by the sensor is lower than the predetermined threshold value, the processor is configured to set the operation mode of the camera device to a nighttime mode and to dispose the third filter on the rear side of the lens.

7. The camera device according to claim 6, wherein:
the incident light having the plurality of different wavelength bands includes a first light having wavelength bands in the visible region and the near-infrared region and a second light having a single wavelength indicating any color component in the visible region, the second light being generated by the birefringence.

8. The camera device according to claim 6, wherein:
the second filter is a visible light cut filter or a band-pass filter that cuts light in the visible region, and
the first filter is a polarizing filter that restricts the transverse wave component of the incident light.

9. The camera device according to claim 6, wherein the processor is configured to control driving of the fourth filter when the daytime mode is detected.

10. The camera device according to claim 6, wherein the incident light is generated based on the birefringence by a car film of a vehicle to which the car film is adhered, and
a face of an occupant of the vehicle is imaged as the subject.

* * * * *